United States Patent [19]

Wasser

[11] 4,313,321

[45] Feb. 2, 1982

[54] FUEL TANK LOCK

[76] Inventor: Donald F. Wasser, 214 S. Chestnut, St. Elmo, Ill. 62458

[21] Appl. No.: 100,427

[22] Filed: Dec. 5, 1979

[51] Int. Cl.³ ............................................. B65D 55/14
[52] U.S. Cl. ........................................ 70/159; 70/232; 220/210
[58] Field of Search ................... 70/158–164, 70/232, DIG. 34, DIG. 57, DIG. 64; 220/210

[56] References Cited

U.S. PATENT DOCUMENTS 1,328,190  1/1920  Whitlock ........................ 70/159 X
1,444,379  2/1923  Jones ............................. 70/160
3,096,409  7/1963  Hubbell et al. .................. 70/161 X
4,030,628  6/1977  Hippert, Jr. .................... 220/210 X

FOREIGN PATENT DOCUMENTS 618637  12/1926  France ............................. 70/232

Primary Examiner—William E. Lyddane
Attorney, Agent, or Firm—Grace J. Fishel

[57] ABSTRACT

A locking means for locking the fuel tank cap on a vehicle such as a large truck such that the fuel cap cannot be removed and the means bolting the locking means to the tank cannot be removed without unlocking the locking means.

3 Claims, 4 Drawing Figures

FUEL TANK LOCK

The present invention relates to a means for locking a cap on a fuel tank.

In these days of fuel shortages and high prices, fuel is often stolen from a vehicle. This is particularly a problem for truckers since the fuel tanks on most big trucks are mounted in the open on the frame of the truck behind the cab.

When the driver of a big truck stops to eat or sleep, he usually has to park his truck in a large yard along with a number of other trucks. These yards are usually not patrolled. Even if the driver stays with his truck, fuel can be stolen as he sleeps, particularly if he leaves the engine running for air conditioning or heating.

In addition to the expense of replacing the fuel, the driver may accidentially run out of fuel if he relies on the fuel being in the tank. If the gas gauge does not work, which is the case in many trucks, the driver figures the amount of fuel left based on the distance driven. Clearly this will result in an erroneous calculation if part of the fuel has been stolen.

In view of the above, there is a need for an effective means for locking the cap on a fuel tank. Among the several objects of the invention, therefore, is the provision of such a locking means. Other objects and features will be in part apparent and in part pointed out hereinafter. The invention accordingly comprises the constructions hereinafter described, the scope of the invention being indicated in the subjoined claims.

In the accompanying drawings in which one of various possible embodiments of the invention is illustrated, corresponding reference numerals refer to corresponding parts throughout the drawings and in which.

Figure 1:
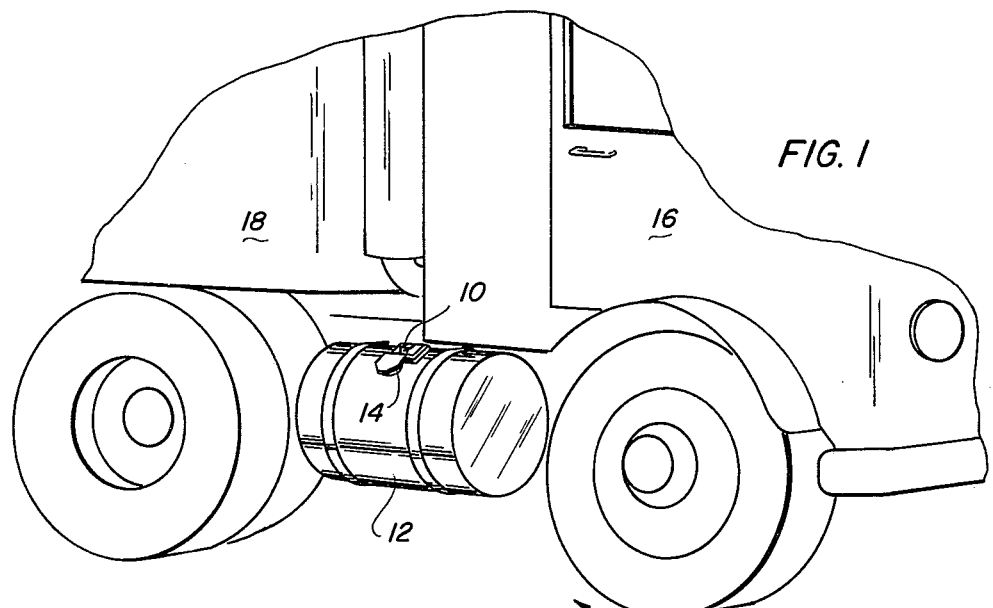
FIG. 1 is a perspective view of a locking means in accordance with the present invention and shown installed on a truck fuel tank.

Referring to the drawings more particularly by reference character, reference numeral 10 refers to a locking means for a fuel tank 12 with a fuel cap 14. As more particularly described below and as best seen in FIG. 1, locking means 10 is mounted on fuel tank 12 such that it covers fuel cap 14. With continuing reference to FIG. 1, it is seen that tank 12 is a cylindrically shaped vessel mounted behind the front axle of a cab 16 between the cab and a trailer 18 of a truck. While tank 12 is illustrated as cylindrical and with cap 14 raised above its outer surface, other tanks have other configurations with the cap recessed. For example, some tanks have flattened sides and are generally rectangular in cross-section. As will be shown, locking means 10 can be adapted for use with these tanks also.

Figure 2:
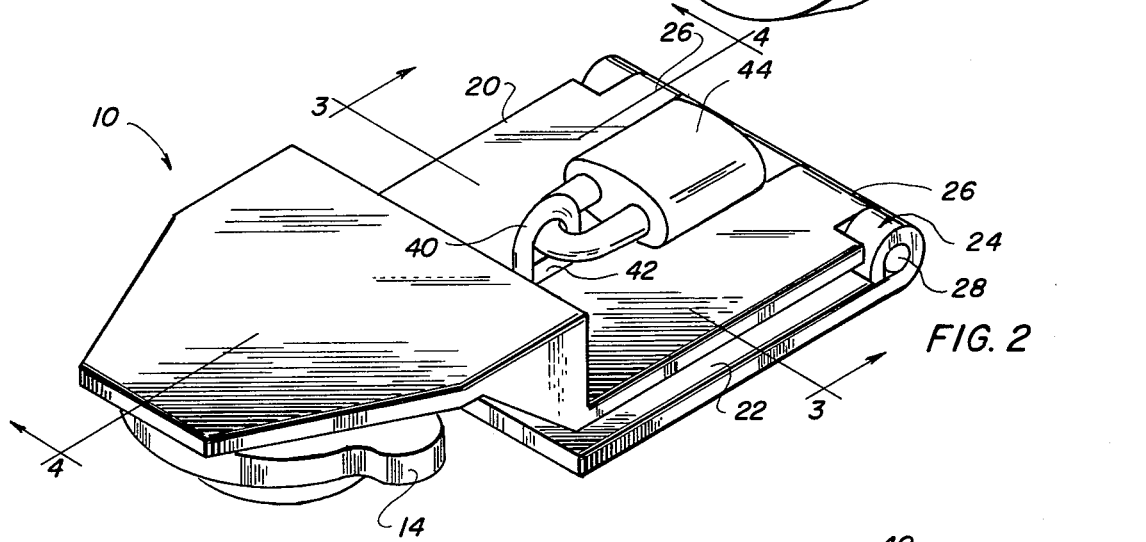
FIG. 2 is an enlarged perspective view of the locking means shown in FIG. 1.
Figure 3:
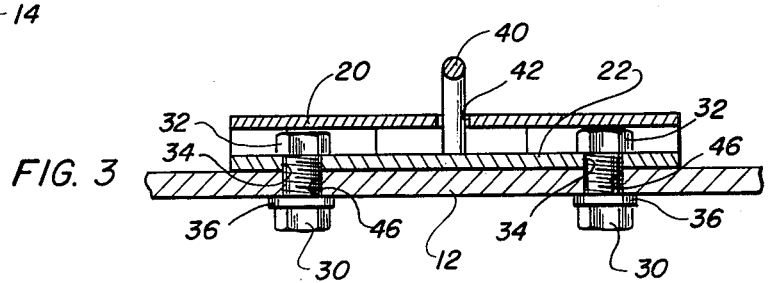
FIG. 3 is a transverse cross-sectional view taken along line 3—3 in FIG. 2; and, FIG. 4 is a longitudinal cross-sectional view taken along line 4—4 in FIG. 2.
Figure 4:
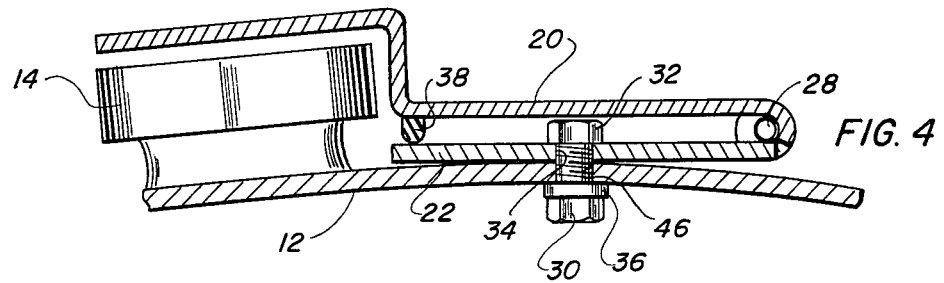

In a preferred embodiment as illustrated in FIGS. 2-4, locking means 10 includes an upper and a lower plate 20 and 22, respectively, hinged together at 24. As shown, hinge 24 comprises knuckles 26 formed from two loops along one edge of plate 20 curled towards three oppositely curled loops formed along one edge of plate 22. Other numbers of knuckles can, of course, be used. A pin 28 passes longitudinally through knuckles 26 and is fixed to plate 22 forming the transverse axis about which plate 20 is journaled.

Turning now to FIG. 4, it is seen that plate 20 is Z-shaped in cross-section such that the distal edge of plate 20 opposite hinge 24 extends beyond the corresponding distal edge of plate 22 and is spaced above tank 12 sufficiently to clear cap 14 while providing a cover which prevents the removal of the cap. When the cap is recessed, plate 20 can be flat. In FIG. 4, it is also seen that plate 20 is arcuate in longitudinal cross-section matching the curvature of tank 12. When tank 12 has flattened sides, it is preferred that the legs of Z-shaped plate 20 be formed in spaced-apart parallel planes, such that the overall configuration of plate 20 is flat, this being but a special case of matching the curvature of the tank.

Locking means 10 are mounted on tank 12 with means for bolting such as bolts 30 and nuts 32. For this purpose a pair of apertures 34 having a diameter slightly larger than the shank of bolts 30 are provided in plate 22 midway the length thereof and symmetrically spaced apart inwardly the side edges thereof. A rubber washer 36 is inserted under the head of each bolt 30 on the inside of tank 12 to seal aperture 34 such that fuel does not splash out and moisture does not leak in.

With continuing reference to FIG. 4, it is seen that plates 20 and 22 are spaced apart by hinge 24 a distance slightly greater than the thickness of nuts 32. The spacing between plates 20 and 22 is maintained by a resilient gasket 38 positioned adjacent the free edge of plate 22 distal the hinge. The purpose of gasket 38 is to keep plates 20 and 22 from vibrating against each other. If a rubber gasket is used, it is preferred that it be attached as a transverse bead to plate 20 substantially parallel to the axis of the hinge adjacent the Z-bend such that it is not splashed with fuel when the tank is filled.

A U-shaped staple 40 is attached adjacent the distal edge of plate 22 and a slot 42 is provided in upper plate 20 through which staple 40 is slipped when plate 20 is journaled closed. Plate 20 is then held secure by a shackling means such as by a padlock 44 slipped through the staple.

In use, locking means 10 are easily installed by drilling holes 46 in tank 12 spaced for registry with apertures 34 in plate 20. It is preferred that holes 46 be drilled in the top of tank 12 above the normal fuel level in the tank and such that when locking means 10 are installed, plate 20 is swung upwardly on hinge 24 out of the way when locking means 10 are opened. Holes 46 should be located such that the free end of plate 22 is adjacent fuel cap 14 while the free end of plate 20 overlies it.

After holes 46 have been drilled, locking means 10 are hinged open and apertures 34 are aligned with holes 46. The installer then removes fuel cap 14 and reaches inside of the tank, threading rubber washer 36 on the shank of bolt 30 and passing it through one of registered holes 46 and apertures 34. Nut 32 is then tightened on bolt 30 on the outside of tank 12. The second bolt, washer and nut combination is similarly installed through the second pair of registered holes 46 and apertures 34. Since the installer has to reach inside the tank, it is preferred that the fuel level in the tank be low so that he does not get his hands wet with fuel.

With the locking means in place, tank 12 is filled with fuel and cap 14 is placed back on the tank. Plate 20 is swung closed on hinge 24 and staple 40 is slipped through slot 42 in plate 20. Plates 20 and 22 are then locked closed with padlock 44 which passes through staple 40.

In locked condition, locking means 12 provides an effective means for preventing the removal of fuel cap 14. The space between plate 20 and cap 14 is such that the cap cannot be completely unscrewed and if unscrewed cannot be removed from the tank. Padlock 44 prevents plate 20 from being swung open such that fuel cap 14 can be removed. The spacing between plates 20 and 22 is such that it is difficult to reach nuts 32 and even if reached they cannot be effectively removed. If nuts 32 are tampered with, they will turn with bolts 30 in holes 46 and apertures 34. To remove them, it is necessary to stop the rotation of the bolts by holding the head of the bolt. This is impossible, of course, without removing the fuel cap and reaching inside the tank. Other holes (not shown) can be formed in plate 20 in registry with nuts 32 such that when plate 20 is closed over fuel cap 14, plate 20 serves as a guard around nuts 32 thus making it even more difficult to get a wrench on them.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A locking means for a fuel tank having a fuel cap comprising first and second plates joined along one edge by a hinge, said first plate opposite said hinge extending beyond said second plate substantially the width of said fuel cap and matching the curvature of the tank, means for bolting said second plate to the fuel tank, said hinge spacing the first plate from the second plate such that the first plate overlies the means for bolting, said second plate adapted to be bolted to the fuel tank such that the first plate overlies the fuel cap without enclosing it when said first and second plates are hinged closed to prevent removal of the fuel cap, means for shackling said first and second plates closed, said means for shackling the first and second plates closed comprising a staple, a hasp and a padlock, said staple attached to the second plate and said first plate having a slot forming the hasp through which the staple passes whereby the fuel cap cannot be removed and whereby the means for bolting cannot be removed without unshackling the shackling means, said locking means further including a gasket which is attached between said first and second plates and which is attached to the first plate substantially parallel to said hinge.

2. The locking means according to claim 1 wherein the means for bolting the second plate to the fuel tank comprises a bolt having a head and a shank, the shank of which is passed through the fuel tank and the second plate and is tightened by a nut, said hinge spacing the first and second plates apart a distance which is slightly larger than the thickness of the bolt head or nut therebetween.

3. The locking means of claim 2 wherein the first plate has a Z-shaped cross-section normal to the axis of the hinge such that the legs of the plate are spaced apart in substantially parallel planes.

* * * * *